United States Patent [19]
Stencel

[11] Patent Number: 5,483,810
[45] Date of Patent: Jan. 16, 1996

[54] DIE SET FOR FORMING A FASTENER WITH THREAD LOCK

[75] Inventor: Edgar L. Stencel, Alta Loma, Calif.

[73] Assignee: Monogram Aerospace Fasteners, Los Angeles, Calif.

[21] Appl. No.: 274,774

[22] Filed: Jul. 14, 1994

Related U.S. Application Data

[62] Division of Ser. No. 990,040, Dec. 14, 1992, Pat. No. 5,340,253.

[51] Int. Cl.[6] ............................................. B21H 3/06
[52] U.S. Cl. ........................................... 72/88; 72/469
[58] Field of Search .................................. 72/88, 90, 469

[56] References Cited

U.S. PATENT DOCUMENTS

| | | | |
|---|---|---|---|
| 1,963,845 | 6/1934 | Hosking | 411/938 |
| 2,177,005 | 10/1939 | Purtell | 411/311 |
| 2,202,868 | 6/1940 | Reohr | 411/938 |
| 2,484,644 | 10/1949 | Poupitch | 411/938 |
| 2,788,046 | 4/1957 | Rosan | 411/311 |
| 3,040,425 | 6/1962 | Muenchinger | 411/420 |
| 3,124,188 | 3/1964 | Muenchinger | 411/309 |
| 3,176,746 | 4/1965 | Walton | 411/311 |
| 3,339,389 | 9/1967 | Mosow | 411/334 |
| 3,459,250 | 8/1967 | Tabor | 72/88 |
| 3,589,157 | 6/1971 | Tabor | 72/90 |
| 3,850,215 | 11/1974 | Orlomoski | 72/88 |
| 3,882,917 | 5/1975 | Orlomoski | 411/309 |
| 3,885,613 | 5/1975 | Evans | 411/311 |
| 3,972,359 | 8/1976 | Thomas | 411/308 |
| 3,972,360 | 8/1976 | Cadwallader | 411/310 |
| 3,972,361 | 8/1976 | Ollis, Jr. | 411/938 |
| 3,982,575 | 9/1976 | Ollis, Jr. et al. | 411/310 |
| 4,136,416 | 1/1979 | Thomas | 72/88 |
| 4,260,005 | 4/1981 | Stencel | 411/167 |
| 4,273,175 | 6/1981 | Capuano | 411/310 |
| 4,806,054 | 2/1989 | Rath | 411/417 |
| 4,900,208 | 2/1990 | Kaiser et al. | 411/310 |

FOREIGN PATENT DOCUMENTS

| 90340 | 5/1983 | Japan | 72/90 |
|---|---|---|---|

*Primary Examiner*—Daniel C. Crane
*Attorney, Agent, or Firm*—Pretty, Schroeder, Brueggemann & Clark

[57] ABSTRACT

A threaded fastener that self locks as it is tightened to a fastened object. The thread includes one or more portions that are shifted, resulting in one or more discontinuities in the thread. Each shifted portion of thread is fully formed at the discontinuity. The shifted portions will deform a relatively softer female thread, causing the deformed thread to move up and over the end faces of the shifted portions and to pack up in front of the end faces to prevent any significant loosening of the connection.

9 Claims, 2 Drawing Sheets

DIE SET FOR FORMING A FASTENER WITH THREAD LOCK

This application is a division of application Ser. No. 07/990,040, filed Dec. 14, 1992 now U.S. Pat. No. 5,340,253.

This invention relates to threaded fasteners and, in particular, to self-locking threaded fasteners having discontinuous threads.

BACKGROUND OF THE INVENTION

Threaded fasteners are useful in a wide variety of applications where load bearing conditions are required and where high vibrations can result in the loosening or release of fasteners that are not self-locking. Most conventional self-locking fasteners require deformation of the mating nut with a special tool to obtain the necessary mechanical lock. This process, however, can remove the protective finish from the nut, allowing corrosion to take place. Furthermore, a special nut or collar must be used.

Other fasteners achieve self-locking by slitting or displacing the crest of the thread. For example, in U.S. Pat. No. 2,177,005 to Purtell, a set screw is described wherein the crest of the thread is slit, forming a resilient lip that yields upon tightening of the screw, but which resists loosening of the screw by pressing tightly against the upper side face of the female thread. The lip may also be provided with a sharp edge that digs deeply into the side face of the female thread upon reversal of the screw. This type of fastener, however, does not result in adequate locking in certain instances. In one embodiment, the fastener relies on friction alone to prevent loosening. In the alternative embodiment, a mechanical lock is created upon loosening of the screw. This, however, results in the release of at least part of the preload that has been placed on the fastened connection.

A similar fastener is shown in U.S. Pat. No. 3,124,188 to Muenchinger which describes a screw having a helical thread with disaligned segments. The patent states that the screw may be tightened with a minimum of additional resistance caused by the disaligned segments, whereas, when torque is applied in the opposite sense, to remove the screw, the upper or leading end of each segment will tend to bite into the abutting flange of the female thread with which it is associated, thus resisting removal of the screw. The patent recommends case hardening or other treatment of the screw to impart resilience to the disaligned segments. Accordingly, this fastener also suffers from the disadvantages noted above, namely, it locks upon loosening of the screw, permitting a release of the preload intended to be applied to the fastened joint.

It should, therefore, be appreciated that there still is a need for a threaded fastener that achieves a mechanical lock, without loss of preload, and without the use of special tools or special procedures for achieving such a lock. The present invention satisfies this need.

SUMMARY OF THE INVENTION

The present invention is embodied in a threaded fastener that self-locks as it is being tightened to a fastened object. The fastener destroys the female thread during final setting and therefore is used for permanent installations like a solid rivet. Such a fastener includes a threaded shank that has a bearing end and a lead end, the lead end being the end of the shank that is threaded first. The thread includes one or more portions that are shifted, resulting in one or more discontinuities, respectively, in the thread.

A feature of the present invention is that each shifted portion of thread is fully formed at the discontinuity and is shifted toward the bearing end of the shank relative to the next succeeding portion of the thread. By fully formed, it is meant that the root of the shifted portion of thread is essentially as fully developed as the root of the non-shifted portion of thread. As will be seen, the fully formed thread of each shifted portion has an exposed end face at the discontinuity, that acts as a non-resilient buttress that locks the fastener as the connection is tightened.

The threaded shank of the present invention may be used with a conventional nut, a swaging collar, or may be threaded into a tapped hole. Preferably, the nut or collar, or the material defining the tapped hole, are made of a relatively softer material than the threaded shank. For example, in the case of a threaded shank used with a softer nut for fastening to a workpiece, the nut is threaded onto the shank and as the nut is tightened to the workpiece, a compression force is applied by the nut to the thread of the shank, including the shifted portions of thread. If a sufficient compression load is applied to the shifted portions, the outer edge of the end face of each shifted portion, at each respective discontinuity, will cut into the nut. Upon final setting or tightening of the fastener, the shifted portions will deform the nut causing the deformed nut material to move up and over the end faces of the shifted portions and pack up in front of the buttresses to prevent any significant loosening of the connection. A tight, vibration-resistant, mechanical lock is thus obtained.

Another feature of the present invention is the particular location of the shifted portions on the thread such that the discontinuities occur within the first few revolutions of thread at the bearing end of the threaded shank. It is known that the compression load applied to a threaded fastener is taken up by the first few revolutions of the threaded shank. In particular, the first revolution may take up as much as approximately 35% of the load once the fastener is properly set. Accordingly, placing the buttresses of the shifted portions in the first few revolutions of the thread, and especially placing a buttress in the first revolution, ensures that a sufficient force will develop at the outer edges of the shifted portions to cause deformation of the nut.

The present invention is also embodied in a die set that is used in manufacturing the above-described threaded fasteners. Both dies of the die set have lands and grooves that are set at a predetermined pitch. One of the dies, however, is provided with an insert near its "exit" end having a separate set of lands and grooves. The insert is located in the die so as to receive an already fully formed threaded shank. The lands and grooves of the insert then shift the first few revolutions of thread of the fully formed shank to create the above described shifted portions of thread. The insert is close enough to the exit end so that the shifted portions are not re-rolled prior to exiting the die set. The grooves of the insert are deep enough to ensure that the shifted portions on the threaded shank are fully formed at the discontinuities.

Other features and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
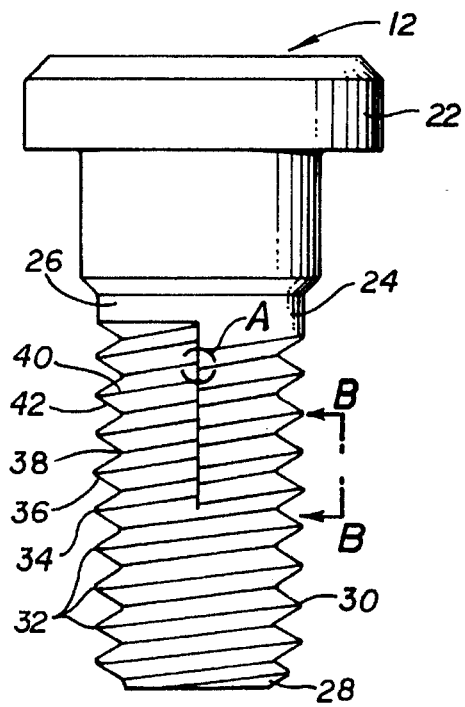
FIG. 1 is an elevational view of a threaded shank having a discontinuous thread in accordance with the present invention.

A threaded fastener embodying the features of the present invention is shown in FIGS. 1–5. FIG. 1 illustrates a pin 12 having the improved thread lock.

The pin 12 includes a head 22 and a shank 24, the shank having a bearing end 26 near the head of the pin and a lead end 28 that is the end of the shank that is threaded first. Between the bearing end and the lead end of the shank is a helical thread 30 made up of a number of revolutions 32. The thread includes a crest portion 34 and a root portion 36, the root portions of axially adjacent revolutions of the thread forming a thread groove 38. Each revolution of the thread also has a pressure side flank 40 and a lead side flank 42.

For purposes of the present description, the thread may be said to be divided into two portions (see FIG. 4), a continuous normal portion 44 of thread beginning at and extending from the lead end 28 of the shank, and a discontinuous portion of thread 46 having a combination of shifted portions 48 of thread and partial normal portions 50 of thread. Preferably, for each revolution 32 of thread in the discontinuous portion, the shifted portion 48 represents approximately one-quarter of the revolution and the partial normal portion 50 represents the remainder. Each shifted portion is continuous with the next preceding revolution of thread (i.e., in the direction of the lead end of the shank), but is discontinuous, at a buttress end 54 thereof, with the next succeeding revolution of thread (i.e., in the direction of the bearing end of the shank). At each discontinuity, a front face 56 at the buttress end of the shifted portion opposes a rear face 58 of the next succeeding revolution creating an interface 60 (see FIGS. 2A and 2B).

The pitch of the thread 30, except for the shifted portions 48, is set at a predetermined angle. The pitch of the shifted portions is set at a greater angle such that the buttress end 54 of each shifted portion is located above the next succeeding revolution at the interface 60. Preferably, the buttress end of each shifted portion is shifted relative to the partial normal portion 50 of the thread approximately one-quarter pitch at the discontinuity.

Figure 2A:
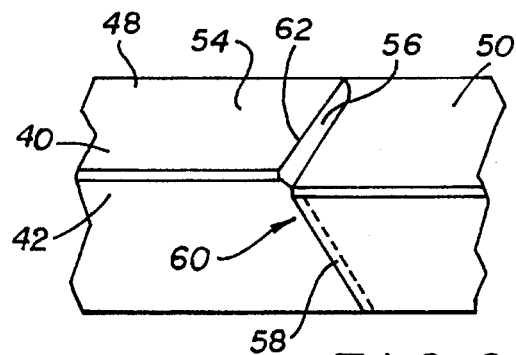
FIG. 2A is an enlarged perspective view of the circled area A in FIG. 1.
Figure 2B:
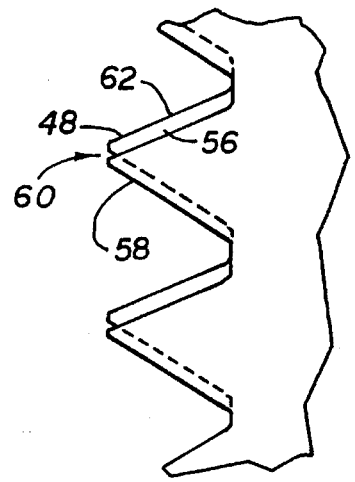
FIG. 2B is an enlarged partial view of FIG. 1 as viewed from line B—B.

With reference now to FIGS. 2A and 2B, the thread lock of the present invention is shown in greater detail. In particular, it is seen that the shifted portion 48 is a fully formed thread. By fully formed, it is meant that the root of the shifted portion of thread is essentially as fully developed as the root of the nonshifted portion of thread. The front face of the shifted portion has an outer edge 62 that, as will be seen, acts as a cutting edge that gouges into the female thread of a nut, collar or a tapped hole.

Figure 3:
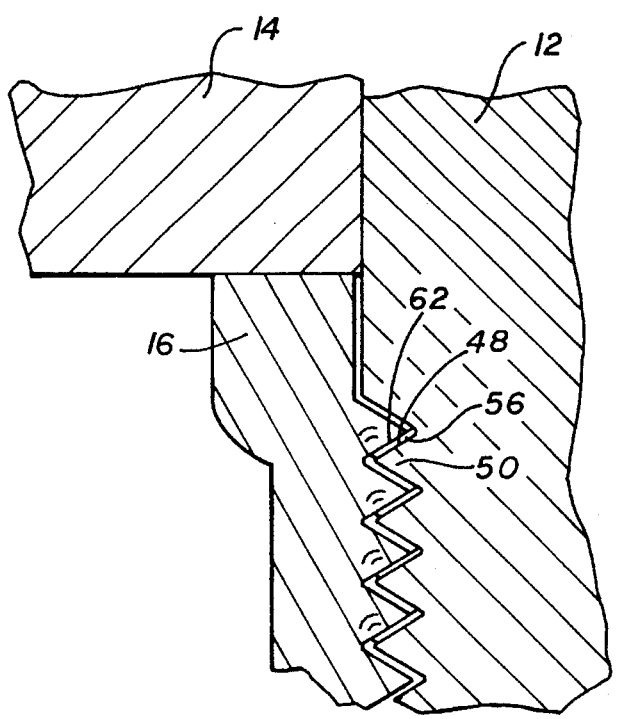
FIG. 3 is a sectional view of a nut threaded onto a threaded shank in accordance with the present invention.
Figure 4:
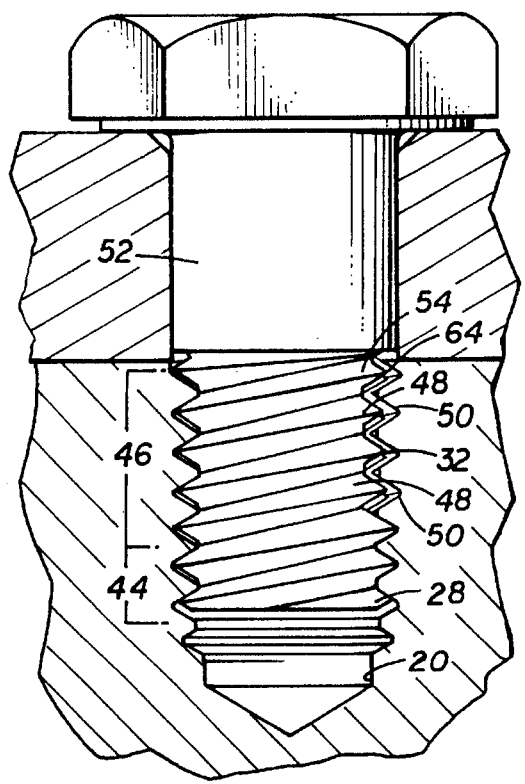
FIG. 4 is a sectional view of a threaded shank in accordance with the present invention threaded into a tapped hole.

With reference to FIG. 3, the above-described pin 12 and a nut having female threads and grooves are shown fastened to a workpiece 14. The pin is preferably made of hardenable material and the nut is made of a relatively softer material, such as aluminum, stainless steel or titanium. As the nut is tightened, it moves up on the pin and out of the page as viewed in FIG. 3. During initial fastening, the grooves of the nut are sufficiently wide to simultaneously accommodate the shifted portions 48 and the partial normal portions 50 of the thread at the discontinuities. Once the nut bears on the workpiece, however, a compression force will be applied by the nut onto the pressure side flanks 40 of the thread. Upon final setting of the fastener, significant force will build up on the pressure side flanks and, in particular, the force will be especially concentrated along the outer edges 62 of the shifted portions, causing the outer edges to plastically deform the female thread. This, in turn, will cause the nut to ramp up and over the outer edges. The deformed nut material will then pack up against the front face 56 of the shifted portion. The front face thus acts as a buttress, preventing any significant loosening of the connection. Similarly, with reference to FIG. 4, a bolt 52 is tightened in a clockwise direction (as shown by the arrow) into a tapped hole 20, causing the material forming the tapped hole to deform and pack up in front of the buttress end 54 of the shifted portion of thread.

It will be appreciated that after final setting of the fastener, the female thread will have been destroyed, forming a mechanical lock between the pin and the female thread. Of importance, is that this mechanical lock is formed during final tightening of the fastener and thus will hold the preload better than prior fasteners that have used other forms of thread locks.

In the preferred embodiment of the present invention, the discontinuous portion 46 of thread comprises the first few revolutions of thread at the bearing end 26 of the shank and, in particular, a discontinuity 64 is located in the very first revolution of thread at the bearing end of the shank. This is to take advantage of the compression load acting on the pressure side flanks of the first few revolutions of the thread at the bearing end of the shank. The first revolution itself may take up as much as approximately 35% of the compression load. This load is transmitted throughout the thread length, including the outer edge 62 of the shifted portion. This high force will cause the outer edge to plastically deform the softer female thread. For example, applying a 1600 lb. pre-load to a pin having a 0.250-28 UNJF-3A thread form, will result in an approximate load of 560 (1600×0.35) lbs. throughout the length of the first thread. Measuring the area of the outer edge by its length (approximately 0.03 in.) and edge width (approximately 0.0005 in.) results in a cross-sectional area of approximately 0.000015 sq. in. taking up the 560 lb. load or approximately 37 million psi. A nut made of 2024-T6 aluminum, for example, has a bearing strength of approximately 129,000 psi, thus the outer edge will easily cut into the nut thread upon final setting of the fastener.

Figure 5:
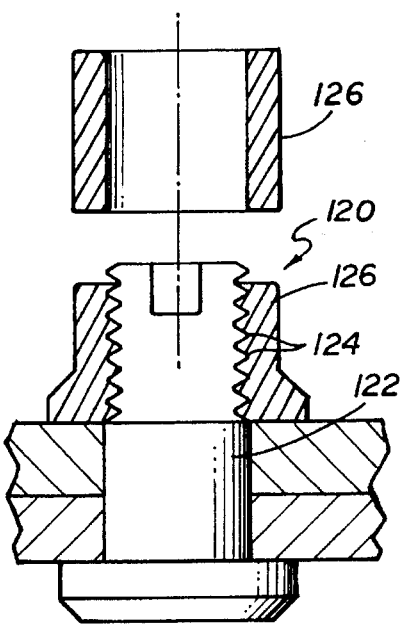
FIG. 5 is a sectional view of a threaded shank in accordance with the present invention used with a swaged collar, the collar shown in a preswaged, undeformed condition and in a swaged, deformed condition.

With reference now to FIG. 5, a swaged fastener 120 is shown including a pin 122 having the thread lock 124 of the present invention and an unthreaded swaging collar 126. The swaging collar is shown above the pin in its preswaged, undeformed condition and also shown swaged to the pin. In the swaged condition, the collar thread is deformed to prevent loosening of the connection. Swaging is accomplished by methods well known to persons having ordinary skill in the art.

Figure 6:
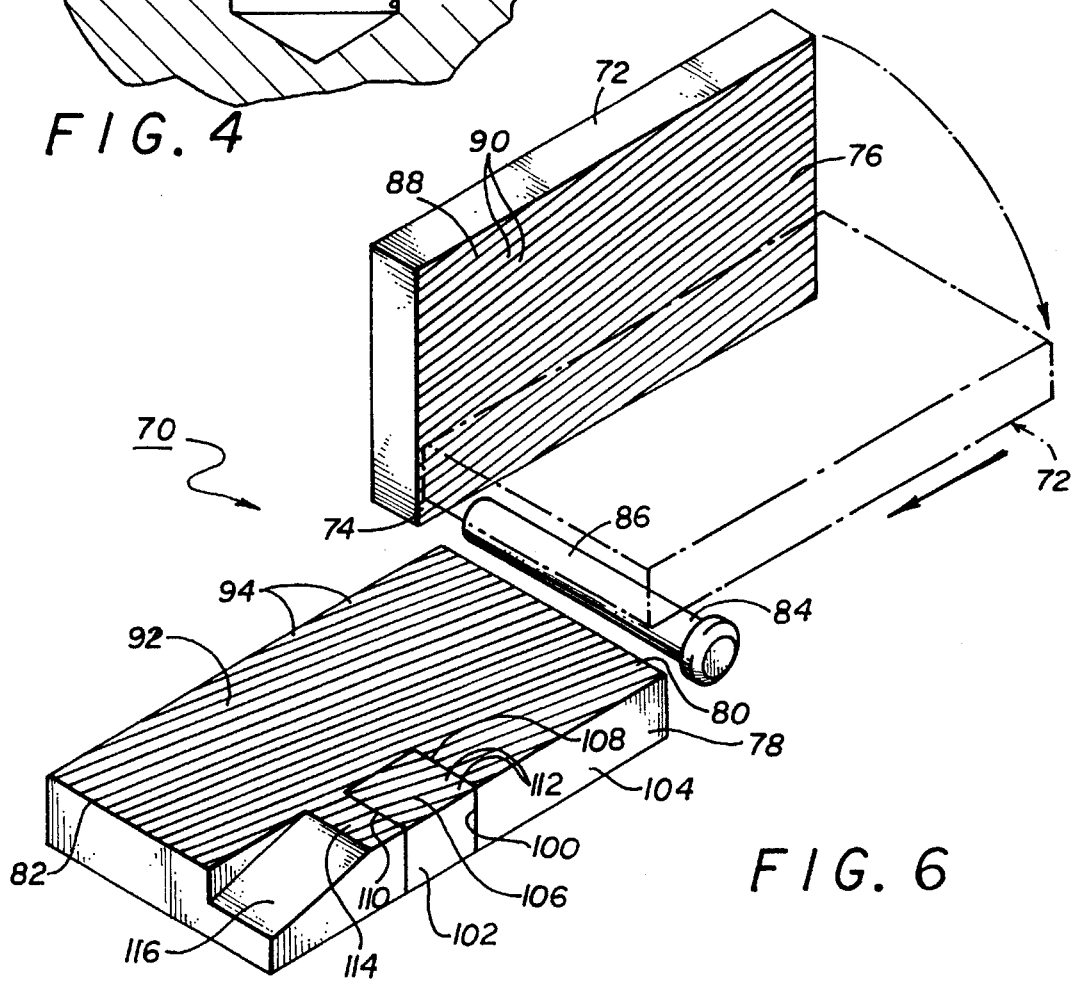
FIG. 6 is a perspective view of a die set in accordance with the present invention.

With reference now to FIG. 6, a thread rolling die set 70 for manufacture of fasteners having the thread lock of the present invention is shown. The die set includes an upper reciprocating die 72 having an entry end 74 and an exit end 76 and a lower stationary die 78 having an entry end 80 and an exit end 82. An unthreaded pin 84 is positioned with its shank 86 between the entry ends of the dies. In the rolling operation, the reciprocating die is moved to the left causing the pin to roll, also to the left, between the two dies and, due to the compression exerted upon the dies, causing the metal of the pin shank to be squeezed into the grooves of the respective dies to form a thread upon the shank. The nature of the thread so formed is, of course, dependent upon the nature of the threading grooves with which the respective dies are provided. Threading dies of the type here in question are customarily provided with their threading grooves by means of grinding operations, the slope or inclination of the grooves, and hence the threads to be formed thereby, being governed by the "grinding angle" employed during the grinding operation.

In the present case, the reciprocating die is shown having a roll surface 88 that includes a set of grooves 90 that are all aligned at a predetermined angle. The stationary die also has a roll surface 92 that includes a set of grooves 94 corresponding to the grooves on the reciprocating die roll surface and formed at the same predetermined angle. The width of the roll surface determines the length of the thread to be formed on the pin, whereas the length of the roll surface must be sufficient to form a fully formed thread on the shank.

In order to form the shifted portion of the thread on the pin, the stationary die is provided with a notch 100 for receiving a special insert 102. The notch is along an outside edge 104 of the stationary die near its exit end 82. In particular, the notch is on the side of the die that will receive the bearing end of the pin. This is to ensure that the first few revolutions of the pin at the bearing end will be shifted. The notch is also sufficiently downstream of the entry end 80 of the die to ensure that the thread of the pin is fully formed before reaching the insert 102. Regarding the size of the notch, its width (i.e., the distance inwardly from side edge 104) will determine the number of revolutions of thread on the pin that will be affected and (its length (i.e., the distance in the direction of rolling) will determine the circumferential length of the shifted portions.

The insert 102 for shifting-the fully formed thread of the pin is received within the notch of the stationary die. The insert has a roll surface 106 that includes an entry side 108 (i.e., the side of the insert that the pin will roll onto first during the rolling process), an exit side 110 (i.e., the side of the insert that the pin will exit from during the rolling process) and a set of grooves 112. The set of grooves on the roll surface of the insert are ground at a greater angle than the set of grooves on the roll surface 92 of the stationary die 78. The insert set of grooves are disposed such that the stationary set of grooves and the insert set of grooves are disaligned at the entry side of the insert, but aligned at the exit side of the insert. The depth of the grooves on the roll surface of the insert is sufficient to create fully formed shifted portions of thread on the pin.

In the preferred embodiment, the stationary die has a support portion 114 on the exit side 110 of the insert and a window portion 116 between the support portion and the exit end 82 of the stationary die. The support portion acts as a downstream support for the insert. Preferably, the support portion is integral with the stationary die and has a grooved roll surface that is continuous with and has the same pitch as the grooves of the roll surface of the stationary die. This latter feature improves the transition between shifted portions and normal portions of thread on the pin.

The window portion 116 is an angled cutout area on the stationary die that prevents the shifted portions of the thread from becoming re-rolled as the pin exits the die set. In this regard, it is important that the combined length of the insert 102 and the support portion 114 be less than 180° of the circumference of the pin to prevent re-rolling of the shifted portions. Alternatively, if the reciprocating die 72 is provided with a window or cutout area at its point of correspondence with the insert and support portion during rolling, then the insert and support portion may have a combined length of up to 360° of the circumference of the pin.

During the thread rolling process, an unthreaded pin will be inserted at the entry end 74, 80 of the die set. Prior to reaching the insert, the thread of the pin will be fully formed. The insert will then cause an abrupt shift in the first few revolutions of the thread at the bearing end of the shank, creating a discontinuity in each of those thread revolutions. The length of the insert (i.e., from entry side to exit side) determines the circumferential length of the shifted portions. Finally, before the pin rotates a full revolution after striking the entry side of the insert, the pin will enter the window portion of the die and subsequently exit the die set.

It should be appreciated from the foregoing description that the present invention provides a fastener having an improved thread lock that achieves a mechanical, vibration-resistant, lock during final tightening of the fastener and that more effectively prevents a release of the preload applied to the fastened joint. The fastener includes a threaded shank wherein each of the first few revolutions of thread have fully formed shifted portions forming discontinuities in the thread. The shank may be used with a nut or a collar made of a relatively softer material, or may be inserted into a tapped hole formed of a softer material or, may even be used with a swaged collar that is swaged onto the threaded shank.

It will, of course, be understood that modifications to the presently preferred embodiment will be apparent to those skilled in the art. Consequently, the scope of the present invention should not be limited by the particular embodiment discussed above, but should be defined only by the claims set forth below and equivalents thereof.

I claim:

1. A die for forming a self-locking thread on an unthreaded pin, comprising:

a block having an entry end, an exit end, and an outside edge disposed between the entry end and the exit end, the pin rolling from the entry end to the exit end during the rolling process, said outside edge defining a rectangular notch in the block, the notch having an entry side parallel to the entry end of the block and an exit side parallel to the exit end of the block, the exit side of the notch being closer to the exit end of the block than the entry side of the notch;

a roll surface on said block bounded by the entry end, the exit end and the outside edge of the block, the roll surface of the block having a set of grooves aligned at a predetermined angle to form a helical thread on the unthreaded pin; and an insert having a roll surface disposed in said notch, the roll surface of the insert having a means for shifting a portion of the helical thread and for forming a plurality of buttress ends on the shifted portion of thread, the means including a set of grooves that is misaligned with the grooves on the block at the entry side of the notch and aligned with the grooves on the block at the exit side of the notch;

wherein the distance between the entry end of the block and the entry side of the notch is sufficient to form a fully formed thread on the unthreaded pin; and wherein the set of grooves of the insert have a sufficient depth such that the shifted portion of thread on the pin, including the buttress ends, are fully formed from crest to root.

2. The die of claim 1 further comprising a window means disposed between the exit side of the notch and the exit end of the block for preventing the shifted portions of the thread from being rerolled during the rolling of the pin.

3. The die of claim 2, wherein the distance between the entry side of the notch and the window means is less than half the circumference of the unthreaded pin.

4. A die set for forming a self-locking thread on an unthreaded pin, comprising:

first and second dies having roll surfaces including grooves for forming a helical thread on the unthreaded pin when the unthreaded pin is rolled between the dies against the roll surfaces; and an insert located in one of the first and second dies having a roll surface located to engage the helical thread during the rolling process;

wherein the roll surface of the insert includes a groove configured to shift a portion of the helical thread and to form a buttress end on the shifted portion of thread, resulting in a discontinuity in the thread, the groove on the roll surface of the insert having a sufficient depth such that the buttress end is fully formed from crest to root at the discontinuity.

5. The die set of claim 4, wherein the insert has an entry side and an exit side, with the pin rolling from the entry side to the exit side during the rolling process, and wherein the insert groove is configured to form the discontinuity in the helical thread at the entry side of the insert.

6. The die set of claim 5, wherein the insert groove is aligned with a respective groove of said one of the first and second dies at the exit side of the insert.

7. The die set of claim 6, wherein the insert groove is configured to form the discontinuity in a first revolution of the helical thread.

8. The die set of claim 4, wherein one of the first and second dies includes a window means for preventing the shifted portion of thread from being rerolled during the rolling process.

9. The die set of claim 8, wherein the insert and window means are part of the first die.

* * * * *